United States Patent
Kondo et al.

(10) Patent No.: US 6,924,064 B2
(45) Date of Patent: Aug. 2, 2005

(54) POSITIVE ACTIVE MATERIAL FOR NON-AQUEOUS ELECTROLYTE SECONDARY BATTERY AND NON-AQUEOUS ELECTROLYTE SECONDARY BATTERY COMPRISING SAME

(75) Inventors: Atsuro Kondo, Kyoto (JP); Junichi Toriyama, Kyoto (JP); Masanao Terasaki, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 660 days.

(21) Appl. No.: 09/985,579

(22) Filed: Nov. 5, 2001

(65) Prior Publication Data

US 2002/0081494 A1 Jun. 27, 2002

(30) Foreign Application Priority Data

Nov. 6, 2000 (JP) .................................... P. 2000-338380

(51) Int. Cl.⁷ ............................................... H01M 4/58
(52) U.S. Cl. .................. 429/231.95; 429/223; 429/224; 429/231.6; 423/593.1; 423/594.3; 423/594.4; 423/594.5; 423/595; 423/596; 423/599; 423/594.15; 423/594.16
(58) Field of Search ............................ 429/231.95, 224, 429/223, 231.6; 423/593.1, 594.3, 594.4, 594.5, 595, 596, 599, 594.15, 594.16

(56) References Cited

U.S. PATENT DOCUMENTS

| 5,702,679 A | 12/1997 | Sheargold et al. |
| 5,742,070 A | 4/1998 | Hayashi et al. |
| 5,766,800 A | 6/1998 | Manev et al. |
| 6,083,646 A | 7/2000 | Sugeno et al. |
| 6,248,477 B1 * | 6/2001 | Howard et al. ............. 429/224 |

FOREIGN PATENT DOCUMENTS

| EP | 0 662 727 A1 | 7/1995 |
| EP | 1 026 765 A1 | 8/2000 |
| JP | 2000-306577 A | 11/2000 |

OTHER PUBLICATIONS

European Search Report dated Apr. 2, 2002.

* cited by examiner

Primary Examiner—Bruce F. Bell
(74) Attorney, Agent, or Firm—Sughrue Mion, PLLC (57) ABSTRACT

A positive active material for non-aqueous electrolyte secondary battery is provided comprising lithium manganese oxide having such a spinel structure that the half-width ($2\theta$) of the reflection peak corresponding to 440 plane as determined by X-ray diffractometry using CuK$\alpha$ ray is not greater than 0.145°. The use of this positive active material makes it possible to obtain a secondary battery which exhibits a good cycle life performance at room temperature and high temperatures and a reduced capacity drop when stored at high temperatures.

9 Claims, 4 Drawing Sheets

POSITIVE ACTIVE MATERIAL FOR NON-AQUEOUS ELECTROLYTE SECONDARY BATTERY AND NON-AQUEOUS ELECTROLYTE SECONDARY BATTERY COMPRISING SAME

FIELD OF THE INVENTION

The present invention relates to a positive active material for non-aqueous electrolyte secondary battery and a non-aqueous electrolyte secondary battery comprising same.

BACKGROUND ART

The non-aqueous electrolyte secondary battery has a high energy density and a prolonged life as compared with the conventional batteries and thus has been used as a power supply for cellular phones, laptop computers, etc.

The non-aqueous electrolyte secondary battery comprises a carbon-based material as a negative active material, a lithium-transition metal composite oxide as a positive active material, and a non-aqueous electrolyte having a lithium salt dissolved therein as an electrolyte. In particular, the positive active material is an important element, which determines the performance such as discharge capacity, discharge voltage, cycle life performance, safety, etc. of non-aqueous electrolyte secondary battery.

A small-sized non-aqueous electrolyte secondary battery which is now commercially available comprises lithium cobalt oxide having a layered $\alpha$-NaFeO$_2$ type structure as a positive active material. However, cobalt, which is a starting material for lithium cobalt oxide, is a rare metal and its price is variable. Further, lithium cobalt oxide is much disadvantageous with respect to the safety of batteries during overcharging, etc. On the contrary, the lithium manganese oxide is a positive active material which is more favorable than other composite oxides in cost and safety of batteries because manganese, which is a starting material for lithium manganese oxide, occurs in abundance and exhibits an excellent thermal stability at high temperatures. Thus, the practical use of lithium manganese oxide is now under extensive study.

However, the lithium manganese oxide is disadvantageous in that its discharge capacity decreases as it is repeatedly charged and discharged. Thus, the lithium manganese composite oxide is not widely used in practice. This capacity drop is attributed to the volumetric change during the charge and discharge process, phase transition due to Jahn-Teller effect and elution of manganese ion at high temperatures. In particular, the elution of manganese ion at high temperatures causes remarkable capacity drop due to charge and discharge cycles at high temperatures and remarkable capacity drop due to storage at high temperatures.

In order to solve these problems, an approach is proposed involving the substitution of some of manganese elements by metals other than lithium and manganese. Many reports have been made on such an approach. The substitution of some of manganese elements by other elements allows the stabilization of the spinel framework structure, making it possible to reduce the elution of manganese and hence improve the cycle life performance of the battery.

However, in accordance with the foregoing approach involving the substitution of some of manganese elements by other elements, the cycle life performance at room temperature can be improved, but the cycle life performance at high temperature or the storage properties at high temperature should be further improved. Further, the effect exerted by the substitution of some of manganese elements by other elements depends greatly on the kind and amount of substituent metals. Thus, when the amount of substitution is insufficient, the resulting effect is insufficient even at room temperature. On the other hand, when the amount of substitution is raised, the discharge capacity per unit weight decreases. Thus, it is necessary that the cycle life performance of lithium manganese oxide be improved as much as possible, which does not depend on the substitution of metal ions.

It is therefore an object of the present invention to improve the cycle life performance, particularly cycle life performance and storage properties at high temperature, of lithium manganese oxide.

SUMMARY OF THE INVENTION

The present invention was accomplished based on the finding that the performance of lithium manganese oxide described above can be improved by controlling the crystallinity appearing on 440 plane of the crystal having a spinel structure. In other words, the positive active material for the non-aqueous electrolyte secondary battery of the invention comprises lithium manganese oxide having a spinel structure such that the half-width (2θ) of the reflection peak corresponding to 440 plane as determined by X-ray diffractometry using the CuKα ray is not greater than 0.145°. Thus, the use of lithium manganese oxide having a spinel structure such that the half-width (2θ) of the reflection peak corresponding to 440 plane as a positive active material makes it possible to obtain a secondary battery which exhibits a good cycle life performance at room temperature and high temperature and little capacity drop after storage at high temperature.

The present invention has been made on the basis of the following findings. In other words, the capacity retention after cycles at high temperature shows little change even when the half-width (2θ) of reflection peak corresponding to 440 plane shows a drop within the range of not smaller than 0.16. However, the capacity retention shows a sudden increase when the half-width (2θ) falls within the range of less than 0.16. Further, the capacity retention after 300 cycles at 60° C. becomes as good as greater than 60% when the half-width (2θ) falls within the range of not greater than 0.145. In order to improve the capacity retention, the half-width (2θ) may be reduced more, preferably to not greater than 0.12.

In addition to the foregoing requirements, it is preferable that the intensities of reflection peaks corresponding to 311 plane, 400 plane and 111 plane of lithium manganese oxide, i.e., $I_{(311)}$, $I_{(400)}$ and $I_{(111)}$, respectively, should satisfy the relationships $I_{(311)}/I_{(111)} \geq 0.44$, $I_{(400)}/I_{(111)} \geq 0.48$ and $I_{(400)}/I_{(311)} \geq 1.09$, particularly $I_{(311)}/I_{(111)} > 0.45$, $I_{(400)}/I_{(111)} \geq 0.55$ and $I_{(400)}/I_{(311)} > 1.10$.

This is because that a battery having better cycle performance at high temperature and better capacity retention after storage at high temperature can be provided. Further, by preparing a positive electrode from a lithium manganese oxide powder having such characteristics, the localization of crystal growth and crystalline strain of lithium manganese oxide in the positive electrode can be prevented to provide isotropic crystalline orientation and smooth migration of lithium ion during charge and discharge, making it possible to obtain a battery having excellent charge-discharge performance at high rate current. In addition to the foregoing specific requirements for intensity ratio, the lithium manganese oxide particle is preferably in substantially spherical form having a curved surface such as sphere and ellipsoid, allowing more isotropic orientation.

DETAILED DESCRIPTION OF THE INVENTION

Ideally speaking, lithium manganese oxide having a spinel structure has lithium ion present in 8a position in 4 oxygen coordination and manganese ion (and metal, if any used to substitute for some of manganese ions) present in 16d position in 6 oxygen coordination. Lithium ion can move through a diffusion path formed by a manganese-oxygen octahedron. Based on these characteristics, the spinel type lithium manganese oxide can be used as a positive active material for non-aqueous electrolyte battery, particularly suitable for non-aqueous electrolyte lithium secondary battery. The non-aqueous electrolyte secondary battery of the invention can be used particularly as a non-aqueous electrolyte lithium secondary battery.

In the invention, by changing the composition ratio of various constituent elements, lithium manganese oxide having various spinel structures can be obtained. In particular, however, lithium manganese oxide represented by the general formula $Li_{1+x}M_yMn_{2-x-y}O_4$ (in which x represents a number of from not smaller than 0 to not greater than 0.2 ($0 \leq y \leq 0.2$); y represents a number of from not smaller than 0 to not greater than 0.15 ($0 \leq y \leq 0.15$), preferably from not smaller than 0 to not greater than 0.10 ($0 \leq y \leq 0.1$); and M represents a metal element other than Mn). This is because the use of this formulation makes it possible to effectively exert an effect of improving the cycle life performance at room temperature and high temperature and decreasing the capacity drop after storage at high temperature. The reason why "y" is preferably from not smaller than 0 to not greater than 0.10 is that when y is greater than 0.10, the resulting lithium manganese oxide may have a reduced capacity density although the effect of lessening the capacity drop remains the same. It is further desirable that the relationship $(1+x)/(2-x-y) > 0.5$ (except in the case where x and y are 0 at the same time) be satisfied. In this arrangement, the crystalline structure of lithium manganese oxide can be kept more stable, making it possible to improve the cycle life performance and storage properties at high temperature of the battery.

In the foregoing general formula, M is not specifically limited so far as it is a metal element other than Mn. In practice, however, Mg, Al, Cr, Fe, Co and Ni are preferably used because substitution is easy. A trivalent stable metal such as Al, Co and Cr is preferably used from the standpoint of maximization of discharge capacity. In particular, Al is preferably used to improve the cycle life performance and storage properties at high temperature of the battery. M represents one or more metal elements. Therefore, a plurality of the foregoing metal elements may be used. However, the amount of M (total amount of substituents M) is preferably from 1 to 10% based on manganese ion from the standpoint of assurance of discharge capacity.

The half-width ($2\theta$) of reflection peak on the reflection X-ray diffraction corresponding to 440 plane of lithium manganese oxide and the ratios of intensities of reflection peaks on the reflection X-ray diffraction corresponding to 311 plane, 400 plane and 111 plane are measured by the powder reflection X-ray diffractometry using the CuK$\alpha$ ray. Since the half-width and the intensity ratio may change depending on measurement conditions, it is preferable to use, as the X-ray source, a CuK$\alpha$ tube (wavelength $\lambda$: 1.5405 angstrom) with the dispersing slit being 1.0°, the scattering slit being 1.0° and the receiving slit being 0.15 mm. It is further desired that K$\alpha$2 be removed from the reflection peak pattern of X-ray diffraction thus measured.

Referring to the reflection angle of respective reflection peaks, the reflection angle of 311 plane reflection peak is preferably from 36.0° to 36.4°, the reflection angle of 400 plane reflection peak is preferably from 43.8° to 44.2°, and the reflection angle of 440 plane reflection peak is preferably from 63.8° to 64.2°. Lithium manganese oxide having reflection peaks present outside these ranges should not be used.

Moreover, lithium manganese oxide having a reflection peak half-width ($2\theta$) of not greater than 0.145° corresponding to 440 plane thus measured is preferably used. Still further, the reflection peak half-width ($2\theta$) corresponding to 311 plane and 400 plane of lithium manganese oxide are each preferably not greater than 0.12°.

In addition to the foregoing requirements, the intensities of reflection peaks corresponding to 311 plane, 400 plane and 111 plane of lithium manganese oxide, i.e., $I_{(311)}$, $I_{(400)}$ and $I_{(111)}$, respectively, preferably satisfy the relationships $I_{(311)}/I_{(111)} \geq 0.44$, $I_{(400)}/I_{(111)} \geq 0.48$ and $I_{(400)}/I_{(311)} \geq 1.09$, particularly $I_{(311)}/I_{(111)} \geq 0.45$, $I_{(400)}/I_{(111)} \geq 0.55$ and $I_{(400)}/I_{(311)} \geq 1.10$. As the positive active material there is preferably used one having a substantially spherical particle form.

Examples of the method to prepare a positive electrode from such a positive active material include a method which comprises mixing lithium manganese oxide powder, a binder such as PVDF, a conductive additive such as acetylene black, etc. with a solvent to prepare a paste, applying the paste to a current collector substrate such as aluminum foil, and then drying the coated material, as in conventional positive electrode comprising as a positive active material lithium cobalt oxide. The positive active material to be used in the preparation of the positive electrode does not necessarily be lithium manganese oxide alone but may be used in admixture with other active materials such as lithium nickelate.

Lithium manganese oxide having the foregoing specific crystal structure may be prepared as follows. A lithium material such as lithium carbonate, lithium hydroxide and lithium oxide and a manganese material such as manganese dioxide and manganese carbonate are properly mixed with hydroxide or oxide of additive metal (M) such as LiAlO$_2$ and Al(OH)$_3$ in a predetermined amount. The mixture is then calcined at a temperature of from 800° C. to 900° C. in an electrical furnace for 5 to 20 hours. After calcining, the sintered product is then ground to prepare a powder having an average particle diameter of from about 5 to 30 $\mu$m formed by aggregates of primary particles. The powder is then subjected to heat treatment at a temperature of from 500° C. to 750° C. for 5 to 20 hours to allow the crystalline growth thereof. The term "average particle diameter" as used herein indicates $D_{50}$ in the measurement of particle size distribution by the laser diffraction scattering method. In some detail, the average particle diameter indicates the value at which the integrated particle diameter reaches 50%. The reason why the average particle diameter of the powder is defined to be from about 5 to 30 μm is that the positive electrode compound comprising a powder having an average particle diameter of greater than 30 μm can crack when applied to the aluminum current collector. On the contrary, when the average particle diameter of the powder falls below 5 μm, the powder has an increased surface area, causing Mn to be eluted more and hence deteriorating the cycle life performance and storage properties of the battery.

The crystalline growth is preferably allowed to occur without causing reagglomeration of particles ground and decomposition of components. The crystalline growth can fairly occur under the foregoing conditions. It is preferred that the powder which has grown be not immediately withdrawn but be allowed to cool to a temperature of not higher than 80° C. in 20 hours or longer to inhibit the occurrence of crystalline strain. It is also preferred that the powder which has grown be not subjected to any grinding but be directly used as a positive active material.

In accordance with this preparation method, lithium manganese oxide having the foregoing crystallinity can be prepared. The conventional method for the preparation of lithium manganese oxide ends when lithium manganese oxide obtained in agglomerated form by calcining is ground to a proper particle diameter, and lithium manganese oxide thus ground is used directly as a positive active material. Therefore, the particles can be distorted or destroyed at the grinding step, deteriorating the crystallinity thereof. Thus, no products having a crystallinity defined herein have been obtained. On the contrary, the use of the foregoing preparation method makes it possible to obtain predetermined desirable lithium manganese oxide particles.

In particular, the employment of spray dry method or the like causes polyhedral primary particles which have undergone crystal growth to be aggregated, forming secondary spherical lithium manganese oxide particles and hence making it easier to obtain an active material of the invention.

As the non-aqueous electrolyte of the invention, each of non-aqueous electrolyte and solid electrolyte may be used. The non-aqueous electrolyte, if used, is not specifically limited. For example, an electrolyte obtained by dissolving a lithium salt such as lithium hexafluorophosphate ($LiPF_6$), lithium tetrafluoroborate ($LiBF_4$), lithium perchlorate ($LiClO_4$) and lithium hexafluoroarsenate ($LiAsF_6$) in a mixture of organic solvents may be used.

As this organic solvent, a mixture of solvent to enhance conductivity of electrolytes and to reduce the viscosity of electrolytes may be preferably used. For example, ethylene carbonate (EC), propylene carbonate (PC), γ-butyrolactone (γ-BL), dimethyl sulfoxide (DMSO) or the like may be used as the solvent to enhance conductivity of electrolytes. Dimethyl carbonate (DMC), diethyl carbonate (DEC), ethyl methyl carbonate (EMC), dimethoxyethane (DME) or the like may be used as the solvents to reduce the viscosity of electrolytes.

In the case where lithium hexafluorophosphate is used as the lithium salt, the amount of Mn to be eluted from the spinel type lithium manganese oxide into the electrolyte at high temperature tends to increase as the concentration of lithium hexafluorophosphate increases. Therefore, the concentration of lithium hexafluorophosphate in the solution is preferably from 0.8 to 1.5 mol/l, more preferably from 1.0 to 1.2 mol/l.

Further, in the case where ethylene carbonate is used as the solvent to enhance conductivity of electrolytes, the amount of Mn to be eluted from lithium manganese oxide into the electrolyte at high temperature tends to increase as the mixing ratio of ethylene carbonate increases. Therefore, the mixing proportion of ethylene carbonate in the solvent is preferably from 10% to 40% by weight.

Inorganic solid electrolytes or polymer solid electrolytes may be used as the solid electrolyte.

The negative electrode to be used in the preparation of the non-aqueous electrolyte battery can be prepared from lithium metal, lithium alloy or carbon-based material. As the carbon-based material, if used, there may be used an artificial or natural graphite having a high crystallinity or soft carbon or hard carbon having a low crystallinity. These carbon-based materials may be used in admixture.

When a carbon-based material is used as the negative electrode material, the battery of the invention is particularly effective. This is because the battery comprising a conventional lithium manganese oxide exhibits very poor cycle life performance and capacity retention at high temperature when a carbon-based material is used as the negative electrode material. This is presumably attributed to the mechanism that manganese ions dissolved in the electrolyte move onto the surface of the negative electrode to form a film increasingly on the interface of the surface of the carbon-based material with the electrolyte at high temperature. The production of this film causes the drop of the charge-discharge capacity of the carbon-based material, resulting in the drop of the battery capacity. On the contrary, in accordance with the invention, the elution of manganese ions from the positive active material can be inhibited, making it possible to further improve the performance of the battery at high temperature.

The non-aqueous electrolyte secondary battery of the invention can be prepared from the foregoing positive and negative electrodes and electrolyte. There are two regions of discharge potential of lithium manganese oxide having a spinel structure with respect to lithium metal, i.e., 3 V region and 4 V region. When the 3 V region is used, a remarkable drop of discharge capacity is observed due to phase transition of Jahn-Teller strain of trivalent manganese. Therefore, when the battery of the invention is used, it is desirable that only the charge and discharge capacity in the 4 V region be used.

The present invention will be further described hereinafter in the following examples.

LiOH as a lithium material, $LiAlO_2$ as a starting material for lithium and aluminum and $MnO_2$ as a manganese material were mixed such that the chemical formula is represented by $Li_{1.1}Al_{0.05}Mn_{1.85}O_4$, that is, the ratio of Li:Al:Mn is 1.1:0.05:1.85. To the mixture was then added a small amount of water. The mixture was then stirred by means of a powder mixer. An electrochemical manganese dioxide which had been ground to an average particle diameter of not greater than 4 μm was used as $MnO_2$. The mixture was then heated to a temperature of 860° C. in an air atmosphere for 10 hours to obtain a sintered product. Thereafter, this sintered product was ground to an average particle diameter of 15 μm. The lithium manganese oxide powder which had been obtained so far as a positive active material was referred to as "positive active material of Comparative Example 1".

Subsequently, the positive active material of Comparative Example 1 was subjected to heat treatment at a temperature of 600° C. in air for 10 hours, and then allowed to cool to a temperature of not higher than 80° C. in 20 hours or longer. The lithium manganese oxide powder which had been obtained so far was referred to as "positive active material of Example 1". Alternatively, the positive active material of Comparative Example 1 was subjected to heat treatment at 500° C. for 10 hours to obtain a lithium manganese oxide powder as positive active material of Example 3.

A positive active material of Comparative Example 2 having an average particle diameter of 15 μm was also prepared in the same process as in Comparative Example 1 except that chemically synthesized manganese dioxide having an average particle diameter of 2 μm was used as $MnO_2$ to be used as a starting material. A positive active material of Example 2 having an average particle diameter of 15 μm was further prepared in the same process as in Example 1 except that chemically synthesized manganese dioxide having an average particle diameter of 2 μm was used as $MnO_2$ to be used as a starting material. In some detail, the positive active material of Comparative Example 2 was obtained by calcining a mixture having the same formulation as in Comparative Example 1 in the same process as in Comparative Example 1 except that a chemically-synthesized manganese dioxide having an average particle diameter of 2 μm was used, and then grinding the material thus calcined to an average particle diameter of 15 μm. The positive active material of Example 2 was obtained by further subjecting the foregoing material to heat treatment in the same process as in Example 1.

The chemically-synthesized manganese dioxide to be used herein is synthesized, e.g., by oxidizing a manganate such as manganese sulfate and manganese carbonate with an oxidizing agent such as sodium perchlorate and potassium perchlorate to produce manganese dioxide having a uniform particle diameter.

LiOH as a lithium material, $Al(OH)_3$ as an aluminum material and $MnO_2$ as a manganese material were mixed by a wet process such that the chemical formula is represented by $Li_{1.1}Al_{0.05}Mn_{1.85}O_4$, that is, the ratio of Li:Al:Mn is 1.1:0.05:1.85. An electrochemical manganese dioxide which had been ground to an average particle diameter of not greater than 4 μm was used as $MnO_2$. The mixture was subjected to spray drying to form a powder which was then subjected to calcining at a temperature of about 850° C. in air to synthesize a lithium manganese oxide powder having an average particle diameter of about 10 μm in a spherical secondary particulate form developed by the agglomeration of primary polyhedral particles. The lithium manganese oxide was referred to as "positive active material of Example 4".

The positive active materials of Examples 1 to 4 and Comparative Examples 1 and 2 were each then subjected to X-ray diffractometry using RINT2400 (produced by Rigaku Corp.). As the X-ray source there was used a CuKα tube (wavelength λ: 1.5405 angstrom). The tube voltage was 50 kV, and the tube current was 200 mA. The dispersion slit (DS) was 1.0°, the scattering slit (SS) was 1.0°, and the receiving slit (RS) was 0.15 mm. The reflection angle 2θ at which measurement was conducted was from not smaller than 10° to not greater than 100°. The scanning angle at which measurement was conducted was 0.02°. The reflection peak of X-ray diffraction thus measured was then subjected to removal of background and Kα2, etc. The removal of Kα2 peak was conducted at a Kα2/Kα1 ratio of 0.498.

Figure 2A:
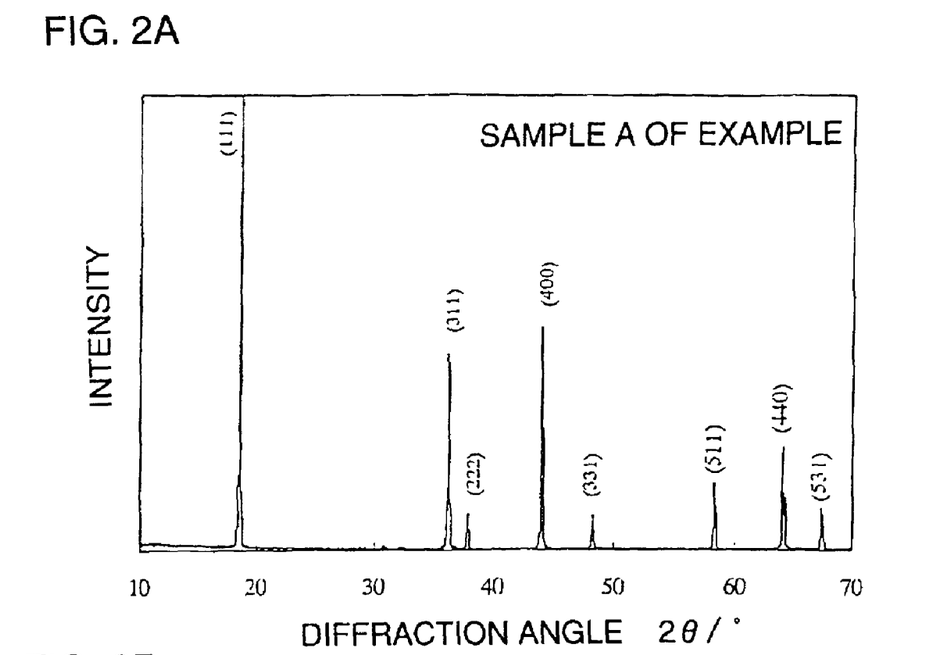
FIGS. 2A and 2B illustrate X-ray diffraction pattern of Example 1 and Comparative Example 1, respectively.
Figure 2B:
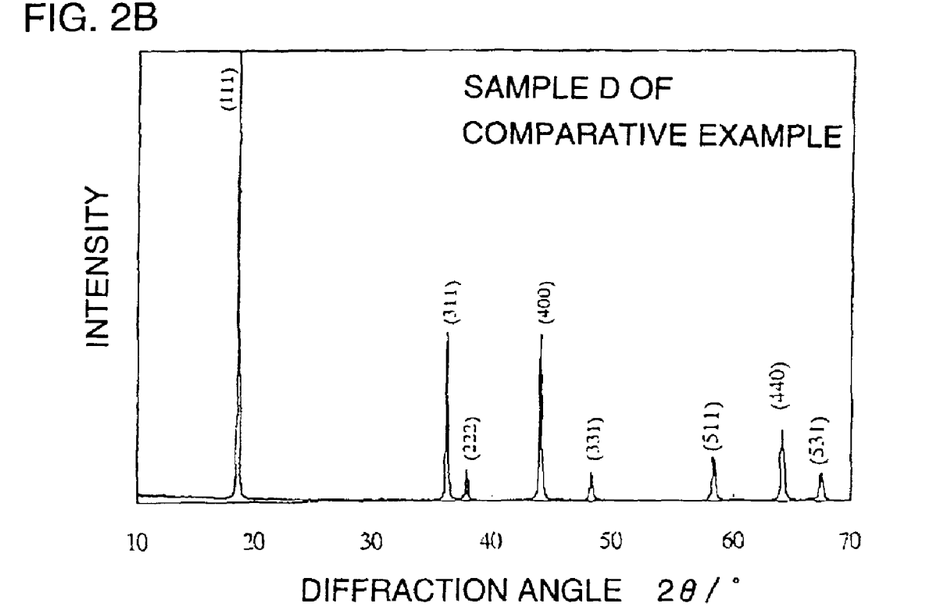

As a result, all the positive active materials of Examples 1 to 4 and Comparative Examples 1 and 2 were observed to have diffraction peaks attributed to spinel structure and thus identified as lithium manganese oxide having a spinel structure. The measurements of the half-width of reflection peak corresponding to 440 plane and reflection peak intensity ratio $I_{(311)}/I_{(111)}$, $I_{(400)}/I_{(111)}$ and $I_{(400)}/I_{(311)}$ of the positive active materials of Examples 1 to 4 and Comparative Examples 1 and 2 are set forth in Tables 1 and 2 below. X-ray diffraction pattern of the positive active material of Example 1 and Comparative Example 1 are shown in FIG. 2.

TABLE 1

| Positive active material | Half-width of 440 plane reflection peak |
| --- | --- |
| Example 1 | 0.118 |
| Example 2 | 0.118 |
| Example 3 | 0.141 |
| Example 4 | 0.141 |
| Comparative Example 1 | 0.165 |
| Comparative Example 2 | 0.188 |

TABLE 2

| Positive active material | Reflection peak intensity ratio $I_{(311)}/I_{(111)}$ | Reflection peak intensity ratio $I_{(400)}/I_{(111)}$ | Reflection peak intensity ratio $I_{(400)}/I_{(311)}$ |
| --- | --- | --- | --- |
| Example 1 | 0.51 | 0.61 | 1.196 |
| Example 2 | 0.51 | 0.60 | 1.176 |
| Example 3 | 0.44 | 0.48 | 1.091 |
| Example 4 | 0.53 | 0.59 | 1.113 |
| Comparative Example 1 | 0.41 | 0.43 | 1.049 |
| Comparative Example 2 | 0.43 | 0.44 | 1.023 |

The foregoing various positive active materials were each used to prepare lithium secondary batteries which were then evaluated. The capacity of these lithium secondary batteries was 500 mAh.

Figure 1:
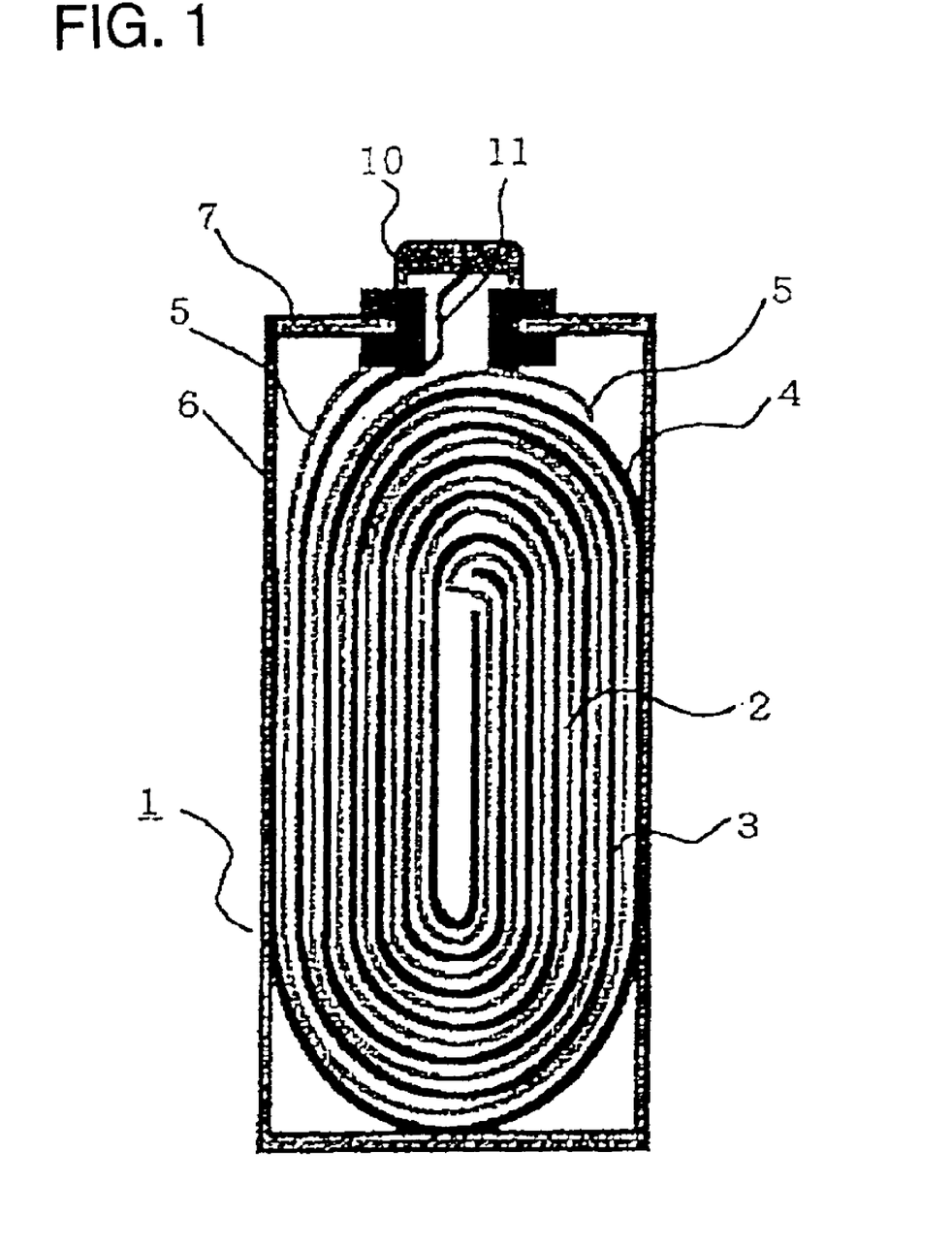
FIG. 1 is a sectional view illustrating an embodiment of the non-aqueous electrolyte lithium secondary battery according to the invention.

FIG. 1 is a sectional view illustrating the structure of the prismatic lithium battery 1 thus prepared. This lithium secondary battery 1 comprises a flat electrode block 2 comprising a positive electrode 3 having a positive electrode compound applied to an aluminum current collector and a negative electrode 4 having a negative electrode compound applied to a copper current collector wound with a separator 5 provided interposed therebetween, and a non-aqueous electrolytic solution containing an electrolyte salt. The electrode block 2 and the non-aqueous electrolytic solution are received in a battery case 6.

The battery case 6 comprises an iron main body having a thickness of 0.3 mm and an external size of 22 mm×47 mm×8.0 mm on which nickel has been deposited to a thickness of 5 μm. The battery case 6 has an electrolyte injection hole (not shown) formed on the upper part of the side face thereof.

The battery case 6 comprises a case cover 7 having a safety valve (not shown) formed therein laser-welded thereto. To the positive electrode is connected a positive electrode terminal 10 via a positive electrode lead 11. The negative electrode 4 is brought into contact with and thus electrically connected to the inner wall of the battery case 6.

The positive electrode 3 was prepared by mixing each of the positive active materials of Examples 1 to 4 and Comparative Examples 1 and 2 with 4 parts by weight of acetylene black as a conductive additive and 8 parts by weight of PVDF as a binder to prepare a paste, applying the paste to an aluminum current collector, and then drying the coated material in vacuo.

The negative electrode 4 was prepared by mixing graphite as a negative active material with 8.5 parts by weight of PVDF as a binder to prepare a paste, applying the paste to a copper current collector, and then drying the coated material in vacuo.

A polyethylene separator was used as the separator 5.

As the electrolytic solution there was used a 1 mol/l solution of lithium hexafluorophosphate as a lithium salt in a 2/2/1 (by weight) mixture of ethylene carbonate, dimethyl carbonate and diethylene carbonate as a solvent.

The various batteries thus prepared were each then measured for cycle life performance and storage properties.

For the measurement of cycle life performance, the batteries were each subjected to 1 CA constant current-constant voltage charge and 1 CA constant current discharge. In some detail, the batteries were repeatedly charged and discharged between 2.75 V and 4.1 V. For convenience of comparison, the cycle life performance test was conducted at a temperature of 60° C. for 300 cycles. The ratio of discharge capacity at 300th cycle to that at 1st cycle was then calculated to determine capacity retention. Thus, the respective batteries were compared.

For the measurement of storage properties, the battery having a battery voltage of 4.1 V was allowed to stand in a 60° C. constant temperature tank for 4 weeks, subjected to 1 CA constant current discharge, 1 CA constant current-constant voltage charge and then 1 CA constant current discharge, and then determined for restored discharge capacity. For the comparison of the various batteries, the ratio of restored discharge capacity to discharge capacity before storage was calculated as retention of restored discharge capacity.

Figure 3:
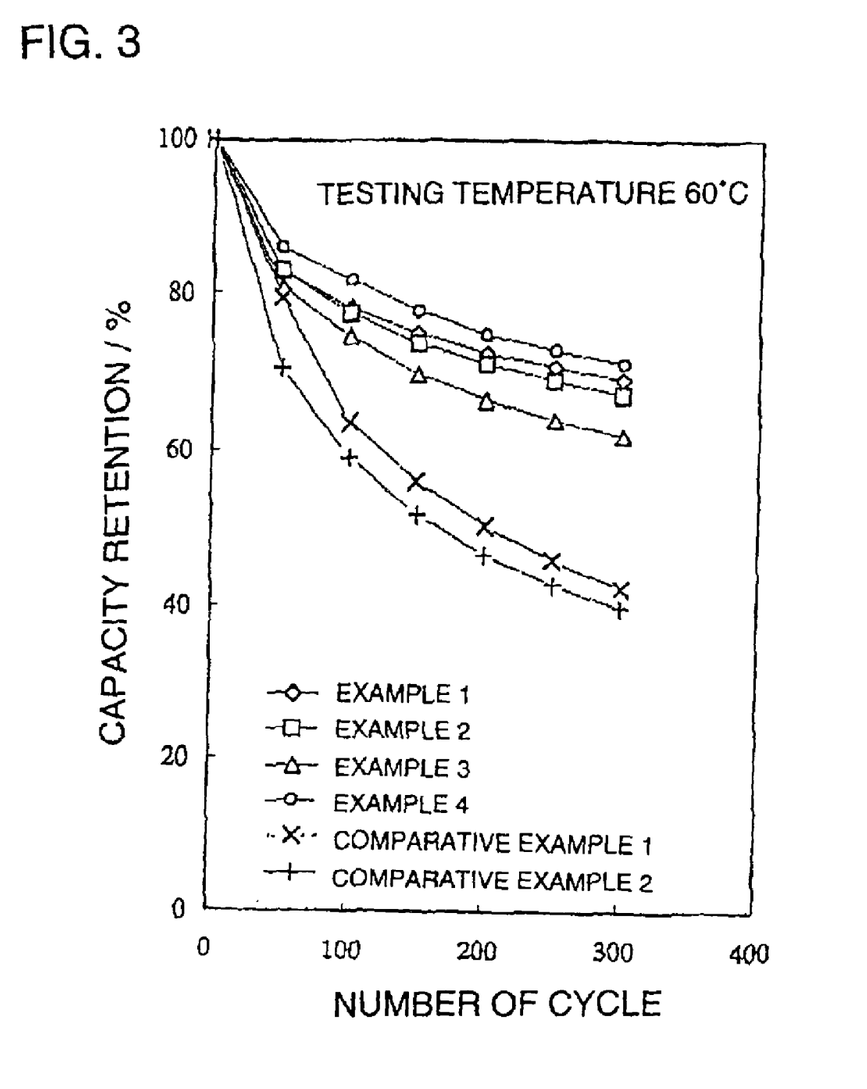
FIG. 3 is a graph illustrating the change of capacity retention with cycle.

The capacity retention after 60° C.–300 cycles and retention of restored discharge capacity of the various batteries are set forth in Table 3 below. The change of capacity retention with cycle is shown in FIG. 3.

TABLE 3

| Positive active material | Cycle life performance capacity retention after 60° C.–300 cycles | Storage properties retention of restored discharge capacity at 60° C. |
| --- | --- | --- |
| Example 1 | 69 | 79 |
| Example 2 | 67 | 78 |
| Example 3 | 62 | 72 |
| Example 4 | 71 | 80 |
| Comparative Example 1 | 42 | 68 |
| Comparative Example 2 | 40 | 55 |

As can be seen in these results, the batteries comprising the positive active materials of Examples 1 to 4, which exhibit a reflection peak half-width (2θ) of not greater than 0.145° corresponding to 440 plane, are excellent both in capacity retention indicating high temperature cycle life performance and retention of restored discharge capacity indicating high temperature storage properties as compared with the batteries comprising the positive active materials of Comparative Examples 1 and 2. In particular, these batteries exhibit a drastically improved capacity retention indicating high temperature cycle life performance. Among the batteries comprising the positive active materials of Examples 1 to 4, those comprising the positive active materials of Examples 1, 2 and 4, which comprise lithium manganese oxide having reflection X-ray diffraction corresponding to 311 plane, 400 plane and 111 plane satisfying the relationships $I_{(311)}/I_{(111)} \geq 0.45$, $I_{(400)}/I_{(111)} > 0.55$ and $I_{(400)}/I_{(311)} \geq 1.10$, are far better than the battery comprising the positive active material of Example 3 in capacity retention indicating high temperature cycle life performance and retention of restored discharge capacity indicating high temperature storage properties.

Figure 4:
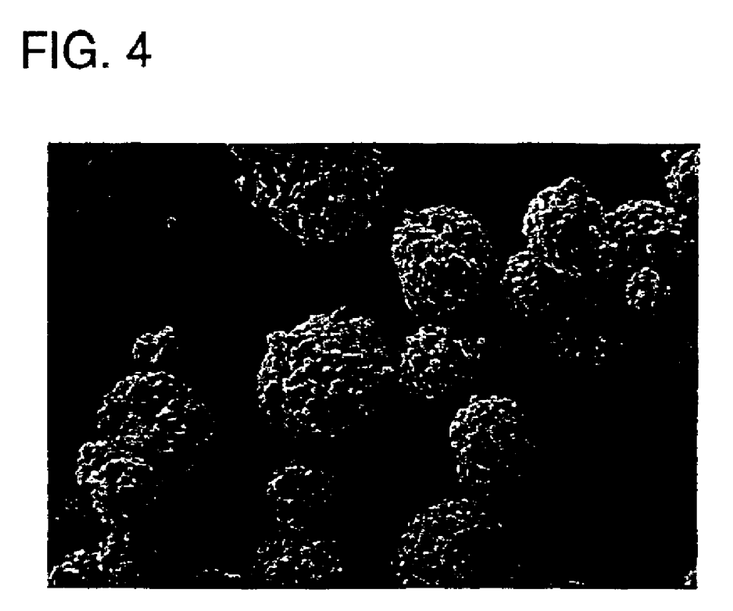
FIG. 4 is a scanning electron microphotograph of Example 4.
Figure 5:
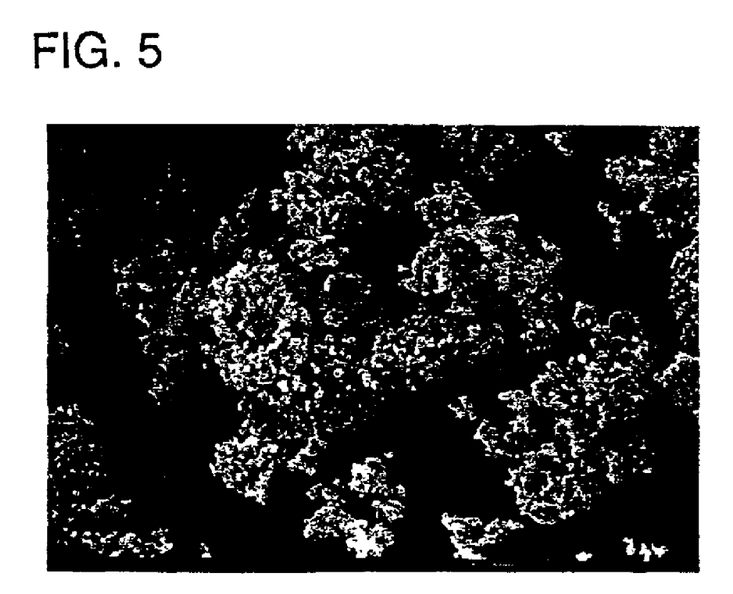
FIG. 5 is a scanning electron microphotograph of Comparative Example 1.

An electron microphotograph of the lithium manganese oxide powder of Example 4 and Comparative Example 1 is shown in FIGS. 4 and 5. The lithium manganese oxide powder of Example 4 was observed to comprise spherical secondary particles formed by the agglomeration of polyhedral primary crystalline particles. On the contrary, the lithium manganese oxide powder of Comparative Example 1 was found to be in an unstable mass.

The present invention is not limited to the embodiments described in the foregoing description and the attached drawings, but various changes and modifications can be made therein without departing from the spirit and scope thereof.

In accordance with the present invention, a practicable secondary battery excellent in high temperature cycle life performance and high temperature storage properties can be provided. In particular, a battery comprising a carbon-based material as a negative electrode and a non-aqueous electrolyte containing a lithium salt can be provided with further remarkable improvement of high temperature cycle life performance and high temperature storage properties.

While the invention has been described in detail and with reference to specific embodiments thereof, it will be apparent to one skilled in the art that various changes and modifications can be made therein without departing from the spirit and scope thereof.

This application is based on Japanese patent application No. 2000-338380 filed Nov. 6, 2000, the entire contents thereof being hereby incorporated by reference.

What is claimed is:

1. A positive active material for non-aqueous electrolyte secondary battery, comprising lithium manganese oxide having a spinel structure and being represented by the following general formula:

$$Li_{1+x}M_yMn_{2-x-y}O_4$$

wherein x represents a number of from not smaller than 0 to not greater than 0.2; y represents a number of from greater than 0 to not greater than 0.15; and M represents a metal element other than Mn, and the half-width (2θ) of the reflection peak corresponding to 440 plane as determined by X-ray diffractometry using CuKα ray is not greater than 0.145°.

2. The positive active material for non-aqueous electrolyte secondary battery according to claim 1, wherein the intensities of reflection peaks corresponding to 311, 400 and 111 planes of said lithium manganese oxide as determined by the X-ray diffractometry using the CuKα ray, $I_{(311)}$, $I_{(400)}$ and $I_{(111)}$, satisfy $I_{(311)}/I_{(111)} \geq 0.45$, $I_{(400)}/I_{(111)} \geq 0.55$, and $I_{(400)}/I_{(311)} \geq 1.10$.

3. The positive active material for non-aqueous electrolyte secondary battery according to claim 2, wherein the average particle diameter of said positive active material in powder form is from 5 μm to 30 μm.

4. The positive active material for non-aqueous electrolyte secondary battery according to claim 1, wherein the average particle diameter of said positive active material in powder form is from 5 µm to 30 µm.

5. A positive active material for non-aqueous electrolyte secondary battery, comprising lithium manganese oxide having a spinel structure and being represented by the following general formula:

$$Li_{1+x}M_yMn_{2-x-y}O_4$$

wherein x represents a number of from not smaller than 0 to not greater than 0.2; y represents a number satisfying that the amount of M is from 1 to 10% based on manganese ion; and M represents a metal element other than Mn, and the half-width (2θ) of the reflection peak corresponding to 440 plane as determined by X-ray diffractometry using CuKα ray is not greater than 0.145°.

6. The positive active material for non-aqueous electrolyte secondary battery according to claim 5, wherein the intensities of reflection peaks corresponding to 311, 400 and 111 planes of said lithium manganese oxide as determined by the X-ray diffractometry using the CuKα ray, $I_{(311)}$, $I_{(400)}$ and $I_{(111)}$, satisfy $I_{(311)}/I_{(111)} \geq 0.45$, $I_{(400)}/I_{(111)} \geq 0.55$, and $I_{(400)}/I_{(311)} \geq 1.10$.

7. The positive active material for non-aqueous electrolyte secondary battery according to claim 6, wherein the average particle diameter of said positive active material in powder form is from 5 µm to 30 µm.

8. The positive active material for non-aqueous electrolyte secondary battery according to claim 5, wherein the average particle diameter of said positive active material in powder form is from 5 µm to 30 µm.

9. A non-aqueous electrolyte secondary battery comprising a positive electrode containing said positive active material as defined in any one of claims 1, 2, 4, 3, 5, 6, 8, and 7, a negative electrode containing a carbon-based material, and a non-aqueous electrolyte.

* * * * *